(12) United States Patent
Hoch (10) Patent No.: US 8,902,191 B2
(45) Date of Patent: Dec. 2, 2014

(54) PROXIMITY SENSING FOR CAPACITIVE TOUCH SENSORS

(75) Inventor: David Hoch, Los Gatos, CA (US)

(73) Assignee: Synaptics Incorporated, Santa Clara, CA (US)

( * ) Notice: Subject to any disclaimer, the term of this patent is extended or adjusted under 35 U.S.C. 154(b) by 172 days.

(21) Appl. No.: 13/311,426

(22) Filed: Dec. 5, 2011

(65) Prior Publication Data

US 2012/0075249 A1 Mar. 29, 2012

(51) Int. Cl.
*G06F 3/044* (2006.01)
*H04M 15/00* (2006.01)
*H04W 4/26* (2009.01)
*H04W 4/24* (2009.01)
*H04L 12/24* (2006.01)

(52) U.S. Cl.
CPC ............. *H04M 15/58* (2013.01); *H04M 15/00* (2013.01); *G06F 2203/04108* (2013.01); *H04W 4/26* (2013.01); *G06F 3/044* (2013.01); *H04W 4/24* (2013.01); *H04L 41/5003* (2013.01); *H04M 2215/0188* (2013.01); *H04L 41/0893* (2013.01); *H04L 41/5025* (2013.01)
USPC .......................................................... 345/174

(58) Field of Classification Search
CPC .................. G06F 3/044; G06F 2203/04108
USPC .................. 345/173, 174; 715/700; 343/702; 324/658
See application file for complete search history.

(56) References Cited

U.S. PATENT DOCUMENTS

| | | | |
|---|---|---|---|
| 7,583,092 B2 | 9/2009 | Reynolds et al. | |
| 7,656,392 B2 | 2/2010 | Bolender | |
| 7,656,393 B2 | 2/2010 | King et al. | |
| 2006/0238517 A1* | 10/2006 | King et al. | 345/173 |
| 2010/0090712 A1 | 4/2010 | Vandermeijden | |
| 2010/0295559 A1* | 11/2010 | Osoinach | 324/658 |
| 2011/0007021 A1* | 1/2011 | Bernstein et al. | 345/174 |
| 2011/0205172 A1* | 8/2011 | Kitada | 345/173 |
| 2012/0044199 A1* | 2/2012 | Karpin et al. | 345/174 |

* cited by examiner

*Primary Examiner* — Sumati Lefkowitz
*Assistant Examiner* — Peijie Shen
(74) *Attorney, Agent, or Firm* — Patterson + Sheridan, LLP (57) ABSTRACT

A method and apparatus for operating an input device having an array of capacitive sensor electrodes and a proximity sensor electrode are disclosed herein. The input device includes a processing system communicatively coupled to the array of capacitive sensor electrodes and the proximity sensor electrode and configured to operate in an input mode and a proximity mode. When operating in the input mode, the processing system scans the array of capacitive sensor electrodes to detect input from an object in an active region of the input device. When operating in the proximity mode, the processing system drives a sensing signal on at least one sensor electrode of the array of capacitive sensor electrodes and receives a resulting signal from the proximity sensor electrode. Based on the resulting signal, the processing system generates an indication of an object presence in a second sensing region from the resulting signal.

19 Claims, 8 Drawing Sheets

PROXIMITY SENSING FOR CAPACITIVE TOUCH SENSORS

FIELD OF INVENTION

Embodiments of the present invention generally relate to an input device, processing system, and method for proximity sensing utilizing capacitive touch sensors.

BACKGROUND

Touch sensor devices (also commonly called touch pads or touch screens) are widely used in a variety of electronic systems. A touch sensor device is typically a sensitive surface that uses capacitive, resistive, inductive, optical, acoustic or other technology to determine the presence, location and or motion of one or more fingers, styli, and/or other objects. The touch sensor device, together with a finger or other object provides an input to the electronic system. For example, touch sensor devices are used as input devices for computers, such as notebook computers.

Touch sensor devices are also used in smaller devices, such as personal digital assistants (PDAs) and communication devices such as wireless telephones and text messaging devices. Increasingly, touch sensor devices are used in multimedia devices, such as CD, DVD, MP3, video or other media players. Many electronic devices include a user interface (UI) and an input device for interacting with the UI. A typical UI includes a screen for displaying graphical and/or textual elements. The increasing use of this type of UI has led to a rising demand for touch sensor devices as pointing devices. In these applications the touch sensor device can function as a cursor control device, selection device, scrolling device, character/handwriting input device, menu navigation device, gaming input device, button input device, keyboard and/or other input device.

One challenge in touch sensor device design is differentiating between deliberate input and incidental contact to the touch sensor device. This is particularly true for wireless communication devices, such as mobile phones. For example, when a user holds a mobile phone near their face to conduct a phone call, the touch sensor device might register input to the mobile phone if the user's face (e.g., cheek) contacts the touch sensor device. As such, when a user holds a mobile phone near their face to conduct a phone call, it may be desirable to deactivate the touch input support while the user is making a call.

Typically, an independent sensor (e.g. infrared sensor) is used for the purpose of detecting the proximity of the user to the sensing region and disabling or otherwise suppressing input in the sensing region of the input device. However, infrared sensors and their supporting circuitry increase the manufacturing costs and are limited to detecting objects in a pre-defined position relative to the infrared sensor. Further, a separate subsystem for the infrared sensor may take up additional space within the electronic system which already faces substantial space and size constraints.

Therefore, there is a need for an improved input device, processing system, and method for sensing an input object relative to a sensing region of a touch sensor device.

SUMMARY OF INVENTION

An input device, processing system for an input device, and method for proximity sensing utilizing capacitive touch sensors are disclosed herein. In one embodiment, an input device includes an array of capacitive sensor electrodes configured to sense objects in a first sensing region of the input device, a proximity sensor electrode configured to sense objects in a second sensing region, different from the first sensing region, of the input device, and a processing system communicatively coupled to the array of capacitive sensor electrodes and the proximity sensor electrode. The processing system is configured to operate in a first mode and a second mode. Operating in a first mode includes driving a sensing signal on a transmitter sensor electrode of the array of capacitive sensor electrodes, receiving a resulting signal from a receiver sensor electrode of the array of capacitive sensor electrodes, and generating an indication of an object presence in the first sensing region from the resulting signal. Operating in the second mode includes driving a sensing signal on a transmitter sensor electrode of the array of capacitive sensor electrodes, receiving a resulting signal from the proximity sensor electrode, and generating an indication of an object presence in the second sensing region from the resulting signal.

In another embodiment, a processing system for an input device includes sensor circuitry configured to be communicatively coupled to a proximity sensor electrode and an array of capacitive sensor electrodes having a plurality of transmitter sensor electrodes and a plurality of receiver sensor electrodes. The processing system further includes control logic configured to operate the input device in a first mode by driving a sensing signal on at least one transmitter sensor electrode of the plurality of transmitter sensor electrodes, receiving a resulting signal from at least one receiver sensor electrode of the plurality of receiver sensor electrodes, and generating an indication of an object presence in a first sensing region from the resulting signal. The control logic is further configured to operate the input device in a second mode by driving a sensing signal on at least one sensor electrode of the array of capacitive sensor electrodes, receiving a resulting signal from the proximity sensor electrode, and generating an indication of an object presence in a second sensing region from the resulting signal, wherein the second sensing region is different from the first sensing region.

In another embodiment, a method of operating an input device having an array of capacitive sensor electrodes offset from a proximity sensor electrode includes operating in a first mode by driving a sensing signal on a transmitter sensor electrode of the array of capacitive sensor electrodes, receiving a resulting signal from a receiver sensor electrode of the array of capacitive sensor electrodes, and generating an indication of an object presence in a first sensing region from the resulting signal. The method further includes switching from the first mode to a second mode and operating in the second mode by driving a sensing signal on at least one transmitter sensor electrode of the array of capacitive sensor electrodes, receiving a resulting signal from the proximity sensor electrode, and generating an indication of an object presence in a second sensing region from the resulting signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following Detailed Description is merely provided by way of example and not of limitation. Furthermore, there is no intention to be bound by any expressed or implied theory presented in the preceding technical field, background, brief summary or the following detailed description.

Various embodiments of the present invention provide input devices and methods that facilitate improved usability of a touch screen device.

Figure 1:
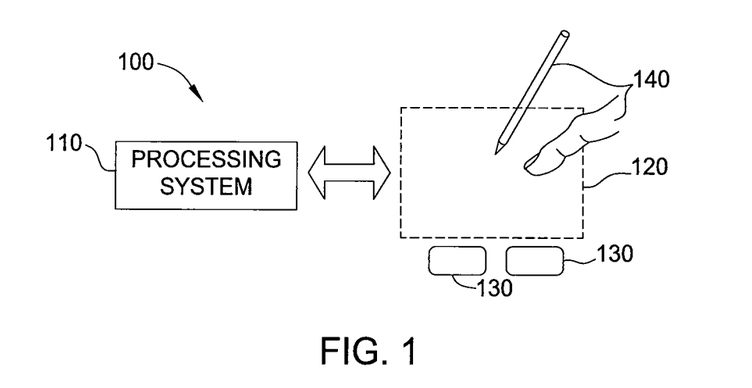
FIG. 1 is a schematic diagram of an exemplary input device, in accordance with embodiments of the invention.

FIG. 1 is a schematic diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such a desktop computers, laptop computers, notebook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in an active sensing region 120. Example input objects include fingers and styli, as shown in FIG. 1.

Active sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the active sensing region 120 extends from a surface of the input device 100 in one or more directions into space until signal-to-noise ratios prevent sufficiently accurate object detection. The distance to which this active sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the active sensing region 120 has a rectangular shape when projected onto an input surface of the input device 100.

The input device 100 may utilize any combination of sensor components and sensing technologies to detect user input in the active sensing region 120. The input device 100 comprises one or more sensing elements for detecting user input. As several non-limiting examples, the input device 100 may use capacitive, elastive, resistive, inductive, magnetic, acoustic ultrasonic, and/or optical techniques. The input device 100 includes an array of sensing elements and a proximity sensor offset from the array of sensing components, as further described below.

Some implementations are configured to provide images that span one, two, three or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, the processing system (or "processor") 110 is shown as a part or subsystem of the input device 100. The processing system 110 is configured to operate the hardware of the input device 100 to detect input in the active sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the active sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the active sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the active sensing region 120, or some other functionality. FIG. 1 shows buttons 130 near the active sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the active sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
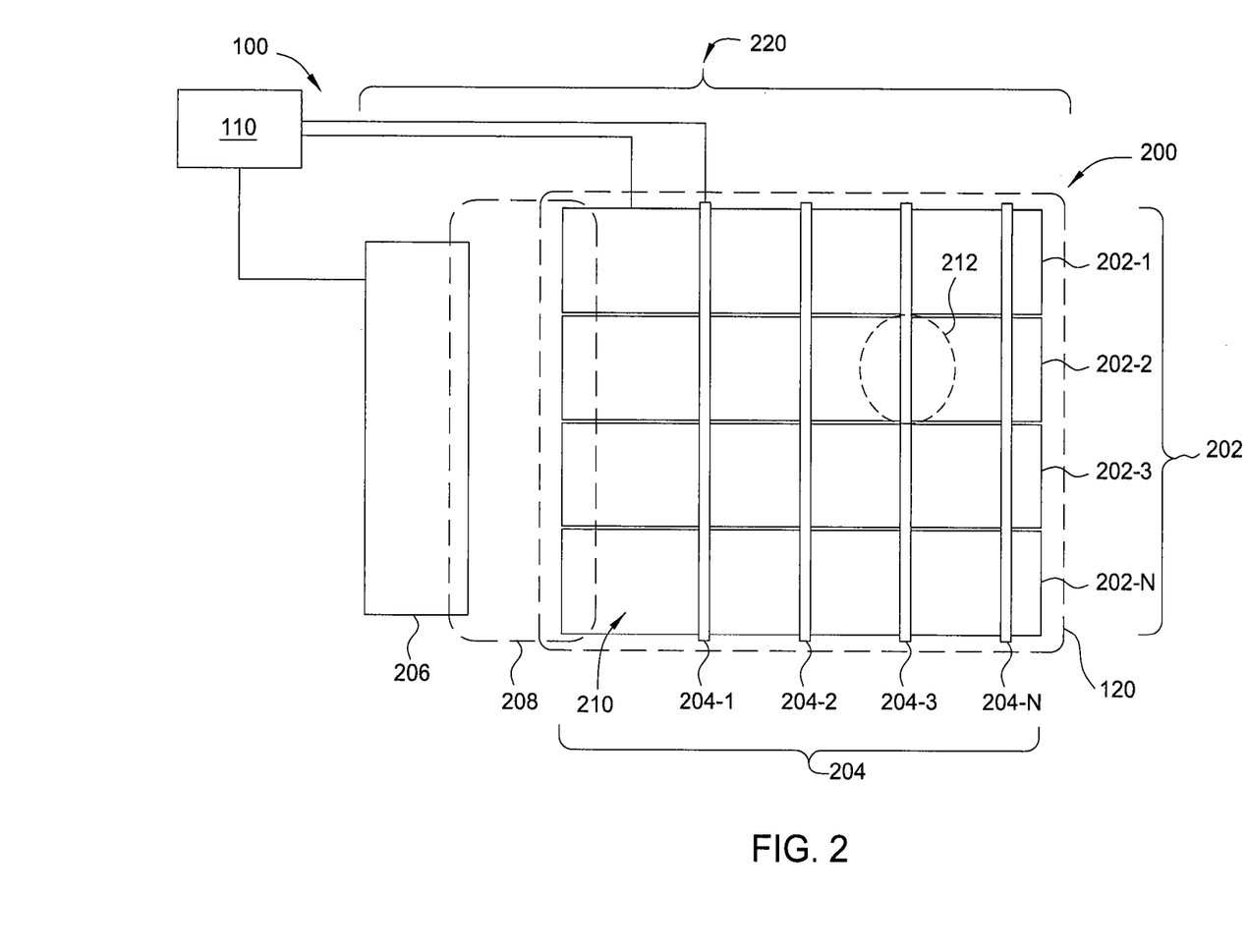
FIG. 2 depicts a schematic diagram of sensing elements of an input device, according to one embodiment of the invention.

FIG. 2 depicts a diagram of sensing elements 220 of the input device 100, according to one embodiment of the invention. The sensing elements 220 include an array of capacitive sensor electrodes 200 and at least one proximity sensor electrode 206. The array of capacitive sensor electrodes 200 generally allows input (or lack thereof) to be detected in the active sensing region 120. Although the active sensing region 120 is depicted as being disposed over the array of capacitive sensor electrodes 200 in the embodiment depicted in FIG. 2, it is to be understood that the active sensing region 120 extends laterally beyond and above the array of capacitive sensing electrodes into space until signal to noise ratio prevent sufficiently accurate object attention, as described above. In the embodiment depicted in FIG. 2, the array of capacitive sensor electrodes 200 are illustratively shown as simple rectangles for purposes of illustration, while it is understood that the array may have other geometric forms. The array of capacitive sensor electrodes 200 includes a plurality of transmitter sensor electrodes 202 (202-1, 202-2, 202-3, . . . 202-n), and a plurality of receiver sensor electrodes 204 (204-1, 204-2, 204-3, . . . 204-n). The plurality of transmitter sensor electrodes 202 may be above, below and/or coplanar with the plurality of receiver sensor electrodes 204. In the embodiment depicted in FIG. 2, the plurality of transmitter sensor electrodes 202 are arranged in parallel rows perpendicular to parallel rows of receiver sensor electrodes 204.

Figure 3:
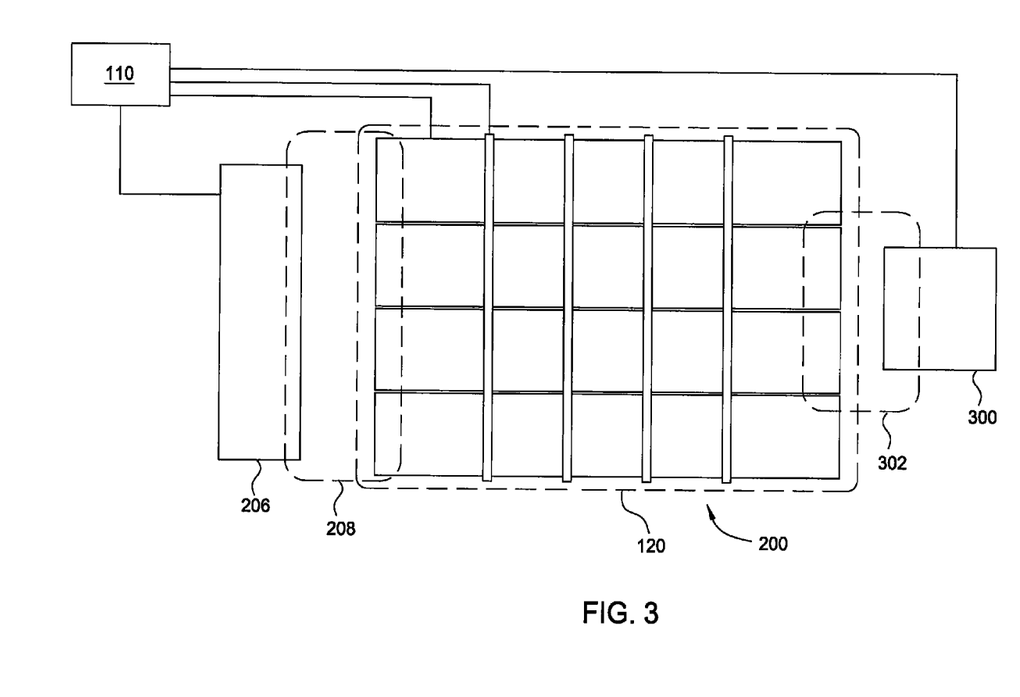
FIGS. 3-5 depict schematic diagrams of sensing elements of input devices according to alternative embodiments of the invention.
Figure 4:
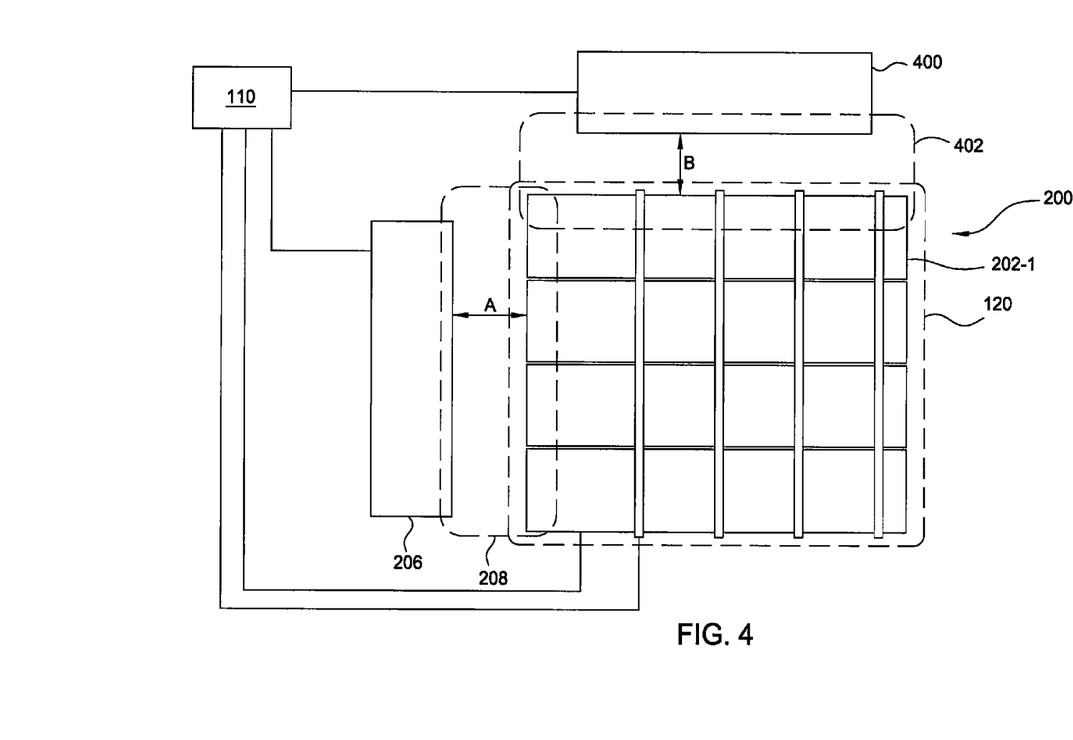
Figure 5:
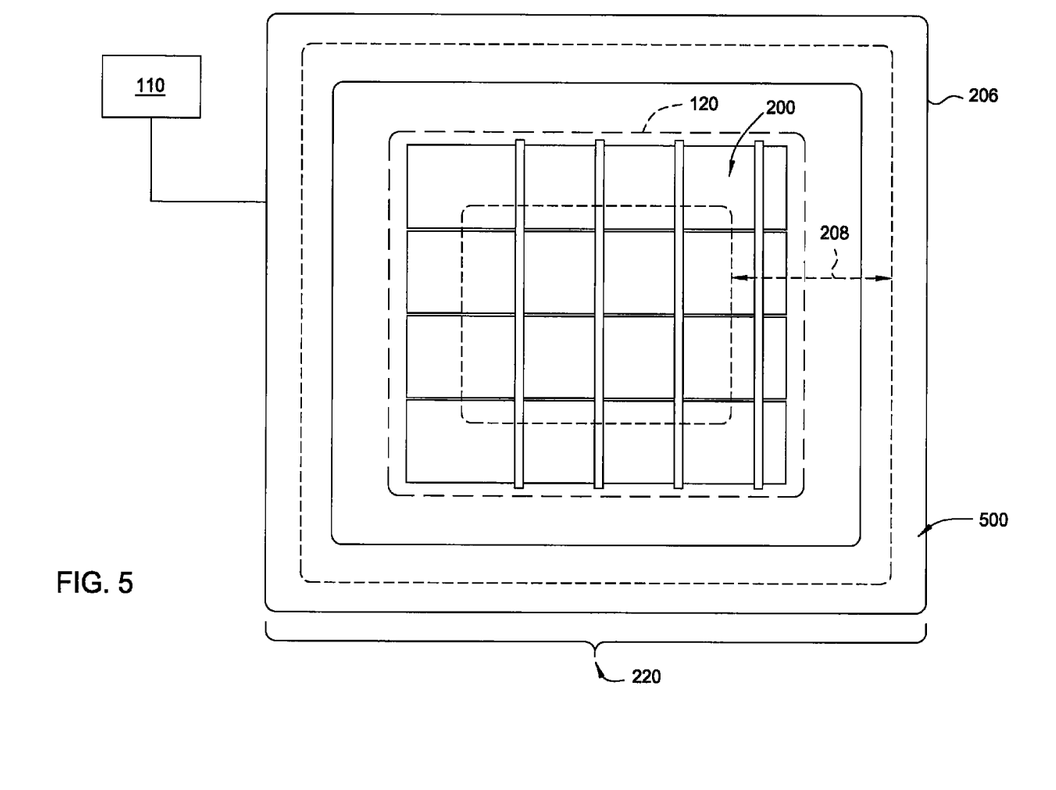

The proximity sensor electrode 206 is configured to sense input (or lack thereof) in a proximity sensing region 208 between the proximity sensor electrode 206 and the array of capacitive sensor electrodes 200. The proximity sensor electrode 206 may be disposed parallel to and adjacent to the array of capacitive sensor electrodes 200. In the embodiment shown, the proximity sensor electrode 206 extends along at least one edge of the array of capacitive sensor electrodes 200. For example, the proximity sensor electrode 206 may extend parallel with the receiver sensor electrodes 204 and/or parallel with the transmitter sensor electrodes 202. Additionally, two proximity sensor electrodes 206 and 300 may be disposed on opposite sides of the array of capacitive sensor electrodes 200, as shown in FIG. 3. In another embodiment, proximity sensor electrodes 206 and 400 may be disposed perpendicular to each other on adjacent sides of the array of capacitive sensor electrodes 200 as shown in FIG. 4. In an alternative embodiment, the proximity sensor electrode 206 may fully or partially circumscribe the array of capacitive sensor electrodes 200. FIG. 5 illustrates proximity sensor electrode 500 fully circumscribing the array of capacitive sensor electrodes 200.

It is noted that the sizing and arrangement of the proximity sensor electrode 206 may be pre-determined to facilitate sensing objects in the proximity sensing region 208. Depending on factors such as what size of object needs to be detected, what distance from the proximity sensor electrode 206 an objects need be reliably detected, and how much physical space is available near the array of capacitive sensor electrodes 200, various configurations of the shape and dimensions of the proximity sensor electrode 206 and distance between the proximity sensor electrode 206 and the array 200 may be selected.

For example, the proximity sensor electrode 300 shown in FIG. 3 has dimensions (i.e., length and width) different than the dimensions of the proximity sensor electrode 206. In another example shown in FIG. 4, the proximity sensor electrode 400 is spaced from the array of capacitive sensor electrodes 200 at a distance (identified as "B") less than the distance (identified as "A") between the proximity sensor electrode 206 and the array 200. As a result, proximity regions 302, 402 between the proximity sensor electrodes 300, 400 and the array of capacitive sensor electrodes 200, respectively, have a size and shape different than the proximity region 208.

In yet another example, described further below, proximity regions 302, 402 may be dynamically determined based on operation of the array of capacitive sensor electrodes 200. In one instance, the array of capacitive sensor electrodes 200 may be activated to different electrical potentials for proximity sensor electrode 206 and for proximity sensor electrode 400 during operation in the proximity mode. In another instance, transmitter sensor electrode disposed near the proximity sensor electrode 400, such as transmitter sensor electrode 202-1, may be individually driven to generate a resulting signal at the proximity sensor electrode 400. In both cases, the proximity sensor electrode 400 receives a resulting signal in response to the presence of the input object 140 in the proximity region 402 between the proximity sensor electrode 400 and the array of capacitive sensor electrodes 200.

Accordingly, embodiments of the invention enable an input device to be configured with proximity region(s) of a particular shape and/or arrangement in anticipation of particular objects, such as a human face.

In one embodiment, as shown in FIG. 2, the transmitter sensor electrodes 202 may include extensions 210 that extend towards the proximity sensor electrode 206. The extensions 210 provide a more uniform signal distribution in the proximity sensing region 208 near the corresponding border of the active sensing region 120, while not interfering with object sensing in the active sensing region 120. The extensions 210 may be configured to extend beyond the last receiver sensor electrode 204 by a distance greater than one-half of the pitch of the receiver sensor electrodes 204 comprising the array of capacitive sensor electrodes 200.

Figure 8A:
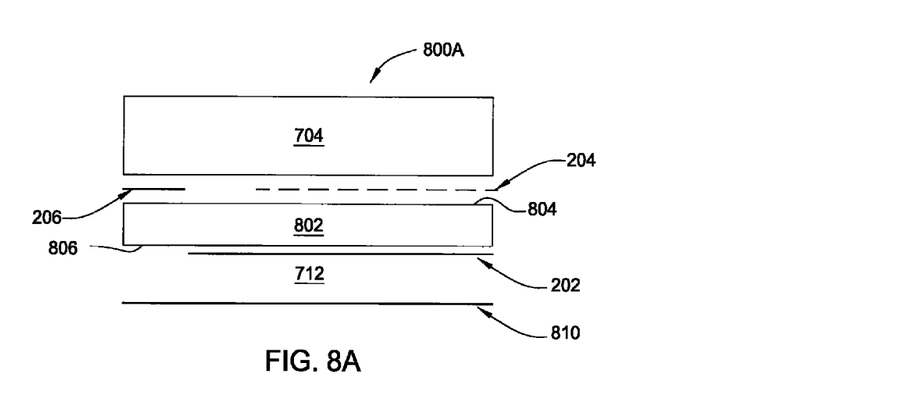
FIGS. 8A and 8B are schematic side views of alternative embodiments of an input device.
Figure 8B:
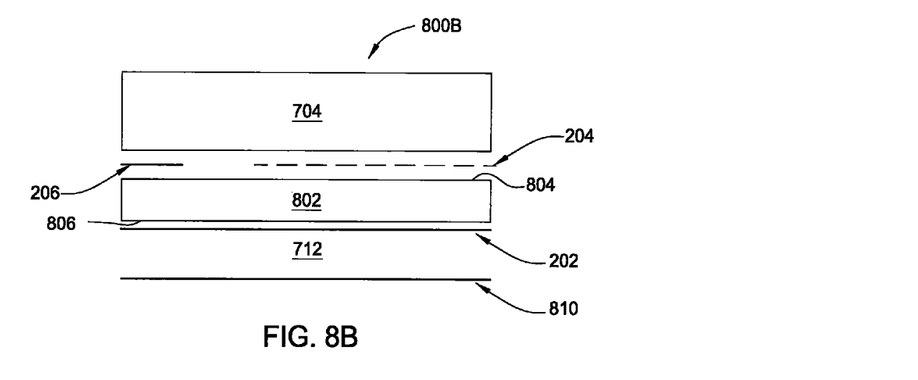

Transmitter sensor electrodes 202 and receiver sensor electrodes 204 are ohmically isolated from each other to enable transcapacity sensing. That is, one or more insulators separate transmitter sensor electrodes 202 and receiver sensor electrodes 204 to allow changes in an electrical field present between the electrodes 202, 204 to be detected by sensing the change in capacitance between the electrodes 202, 204. In some embodiments, transmitter sensor electrodes 202 and receiver sensor electrodes 204 are separated by insulative material disposed between them at cross-over areas; in such constructions, the transmitter sensor electrodes 202 and/or receiver sensor electrodes 204 may be formed with jumpers connecting different portions of the same electrode. In some embodiments, transmitter sensor electrodes 202 and receiver sensor electrodes 204 are separated by one or more layers of insulative material. In some other embodiments, transmitter sensor electrodes 202 and receiver sensor electrodes 204 are separated by one or more substrates; for example, they may be disposed on opposite sides of the same substrate, as depicted in FIGS. 8A and 8B, or on separate substrates that are laminated together.

The areas of localized capacitive coupling between transmitter sensor electrodes 202 and receiver sensor electrodes 204 may be termed "capacitive pixels," an example of which is shown in FIG. 2 as a localized sensing region 212 centered at an "intersection" of the transmitter sensor electrode 202-2 and the receiver sensor electrode 204-3. As such, a plurality of capacitive pixels, similar to the localized sensing region 212, are provided at areas of localized capacitive coupling between each individual transmitter sensor electrode 202 and each individual receiver sensor electrodes 204 (e.g., 202-1 and 204-1, 202-1 and 204-2, 202-1 and 204-3, 202-1 and 204-N, 202-2 and 204-1, and so forth.) The capacitive coupling between the transmitter sensor electrodes 202 and receiver sensor electrodes 204 changes with the proximity and motion of input objects in the sensing region associated with the transmitter sensor electrodes 202 and receiver sensor electrodes 204.

Figure 6:
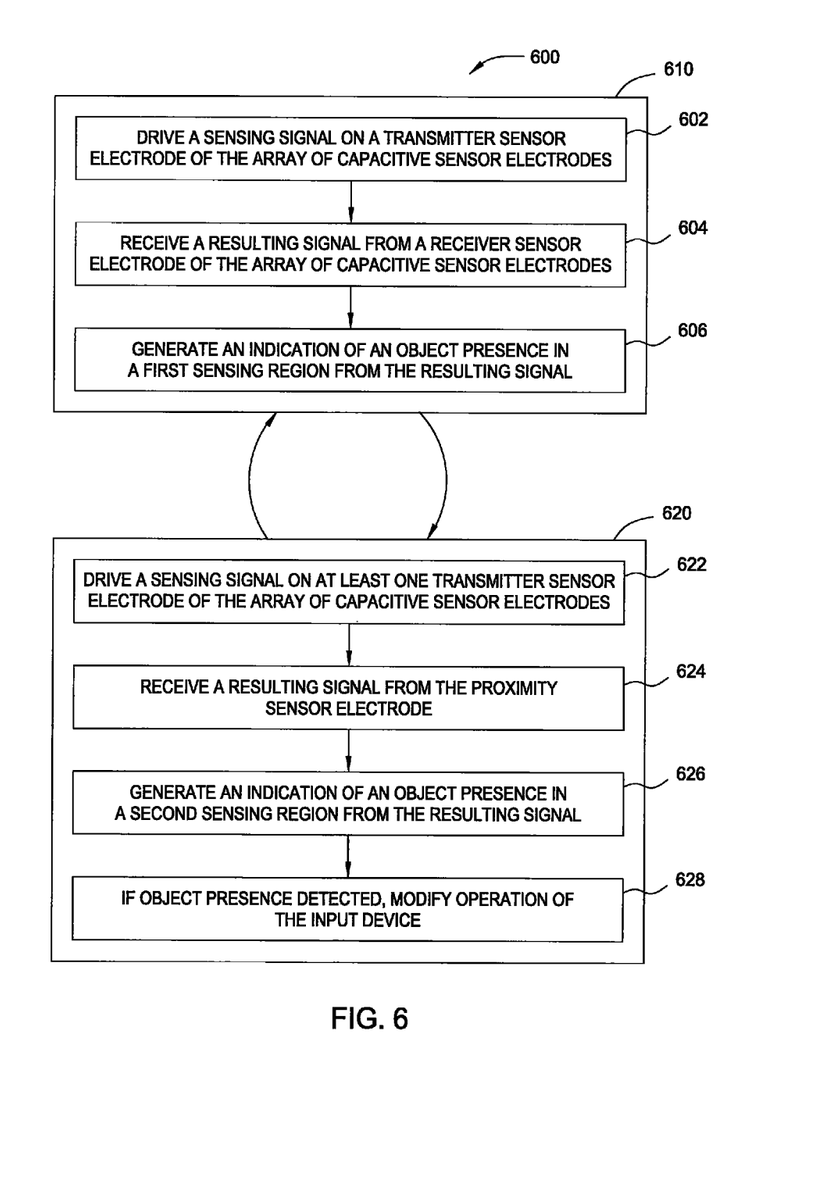
FIG. 6 illustrates a flow diagram illustrating exemplary steps for operating an input device in an input mode and a proximity mode, according to one embodiment of the invention.

According to one embodiment of the invention, the input device 100 is configured to operate in a first mode (referred to as an "input mode") for sensing input objects 140 in the active sensing region (or "active region") 120 of the input device 100. The input device 100 is further configured to operate in a second mode (referred to as a "proximity mode") for sensing objects in the proximity sensing region 208. FIG. 6 illustrates an example method 600 for operating the input device 100 in an input mode and a proximity mode.

The method may begin in either an input mode 610 or a proximity mode 620. In the embodiment depicted in FIG. 6, when operating in the input mode 610, the input device, at step 602, drives a sensing signal on at least one of the transmitter sensor electrodes 202 of the array of capacitive sensor electrodes 200. At step 604, the processing system 110 receives a resulting signal from at least one of the receiver sensor electrodes 204 of the array of capacitive sensor electrodes 200. At step 606, the input device 100 generates an indication (or lack thereof) of the presence of an input object 140 in the active sensing region 120 in based on the resulting signal. The indication of presence of the input object 140 may be provided by the processing system 110 or by another processor coupled to the input device 100.

In some embodiments, the array of capacitive sensor electrodes 200 is "scanned" to determine a metric of capacitive coupling between transmitter sensor electrodes 202 and receiver sensor electrodes 204. That is, the transmitter sensor electrodes 202 are driven to transmit transmitter signals which create an electric field with adjacent receiver sensor electrodes 204. Presence of the input object 140 changes the electric field, and the change can be detected by monitoring the change in capacitance between the electrodes 202, 204. The transmitter sensor electrodes 202 may be operated such that one transmitter sensor electrode transmits at one time, or multiple transmitter sensor electrodes transmit at the same time. In embodiments having multiple transmitter sensor electrodes 202 transmitting simultaneously, the multiple transmitter sensor electrodes may transmit the same transmitter signal and effectively act as an effectively larger single transmitter sensor electrode. Alternatively, the multiple transmitter sensor electrodes 202 may transmit different transmitter signals. For example, multiple transmitter sensor electrodes 202 may transmit different transmitter signals according to one or more coding schemes that enable their combined effects on the resulting signals of receiver sensor electrodes 204 to be independently determined. The receiver sensor electrodes 204 may be operated individually or in a plurality to acquire capacitance information, which changes in response to the driven signal and the presence of an input object interfacing with the electrical field present between the driven transmitter sensor electrode 202 and the receiver sensor electrode 204. The capacitance information, i.e., resulting signals, may be used to determine the location and/or movement of the input object 140 in the active sensing region 120.

A set of measurements from the capacitive pixels form a "capacitive image" (also "capacitive frame") representative of the capacitive couplings at the pixels. Multiple capacitive images may be acquired over multiple time periods, and differences between them used to derive information about the input object 140 in the active sensing region 120. For example, successive capacitive images acquired, over successive periods of time can be used to track the motion(s) of one or more input objects 140 entering, exiting, and within the active sensing region 120.

According to one embodiment of the invention, the input device may be configured to utilize capacitance sensing to detect object proximity in a particular region. It is contemplated that capacitive proximity may be achieved using absolute sensing whereby the direct capacitance to an approaching input object 140 is measured with one or more sensing elements 220. While absolute sensing may provide stronger signals when the input object 140 is "far" away, the absolute sensing approach faces several challenges, including the property that resulting signals change exponentially fast as the input object 140 approaches one of the sensor electrodes 202, 204 and that the capacitance assumes generally very high values when the input object 140 touches the sensor electrodes 202, 204.

As such, it is further contemplated that transcapacitive sensing for proximity may overcome or reduce several of these difficulties. Transcapacitive sensing for proximity is generally more confined to an object interacting with proximity sensing region 208. Proximity sensing region 208 is an area of localized capacitive coupling (similar to one described above) between the proximity sensor electrode 206 and at least one of the transmitter sensor electrodes 202. Furthermore, as mentioned above, the size and separation distance of the proximity sensor electrode 206 from the array of capacitive sensor electrodes 200 can further define a desired proximity sensing region.

In one embodiment, as will be described in detail below, at least two of the sensor electrodes of the array of capacitive sensor electrodes 200 may be excited at the same time with the same potential to act as a single transmitter electrode with the proximity sensor electrode 206 acting as a receiver electrode. The proximity sensor electrode 206 disposed in a spaced-apart relation from the array 200 functions as a corresponding receiver electrode. The transcapacitive coupling between the proximity sensor electrode 206 and at least two of the capacitive sensor electrodes 202, 204 changes with proximity and/or motion of input objects in the proximity sensing region 208.

The input device 100 is configured to operate in a proximity mode, wherein the input device "re-uses" at least a portion of the array of capacitive sensor electrodes 200 in conjunction with the proximity sensor electrode 206 to perform transcapacitive sensing for determining object presence in the proximity sensing region 208. The input device 100 is configured to switch between operating in the input mode 610 and operating in the proximity mode 620. The input device 100 may switch between input mode 610 and proximity mode 620 based on a variety of factors, including but not limited to, explicit signaling from a higher level process, or determined inactivity at the active sensing region 120. Alternatively, the operations may automatically switch between input mode 610 and proximity mode 620 based on a predefined and/or configurable periodicity.

Referring to FIG. 6, at step 622 of the proximity mode 620, the processing system 110 of the input device 100 drives a sensing signal on at least one electrode of the array of capacitive sensor electrodes 200. In one embodiment, a sensing signal may be driven on one or more, or even all, of the transmitter sensor electrodes 202. In another embodiment, a sensing signal may be driven on at least one transmitter sensor electrodes 202 and one or more, or even all, of the receiver sensor electrodes 204 such that the transmitter sensor electrodes 202 and receiver sensor electrode 204 are excited to a same potential and the transmitter sensor electrodes 202 and receiver sensor electrode 204 act as a single transmitter proximity entity. In some embodiments, the capacitive sensor electrodes of the array 200 may pre-selected to be excited based on the location of the proximity sensor electrode 206 in relation to the array 200. For example, at least one transmitter sensor electrodes 202 that is disposed adjacent to and parallel to the proximity sensor electrode 206 may be excited during the proximity mode 620.

At step 624, the processing system 110 of the input device 100 receives a resulting signal from the proximity sensor electrode 206. The resulting signal contains information that is indicative of the presence of an input object in the proximity sensing region 208. At step 626, the processing system 110 of the input device 100 generates an indication of an object presence in the proximity sensing region 208 based on the resulting signal. The indication of an object presence in the proximity sensing region 208 may include positional information as defined herein.

Operations in the input mode 610 and proximity mode 620 may interact to provide additional functionality. In one embodiment, if an input object 140 is detected in the proximity sensing region 208 while operating in the proximity mode 620, operation of the input device 100 is modified at step 628. Modification of the operation of the input device 100 at step 628 may include modifying an indication of object presence in the active sensing region 120, during operation in the input mode 610, in response to an indication of object presence in the proximity sensing region 208 when operating in the proximity mode 620. For example, in response to detecting object presence in the proximity sensing region 208, which may represent a cheek or other unintentional input object, the input device may suppress or disregard object presence in the active sensing region 120. In another example, the input device 100, at step 628, may modify indications of object presence in the active sensing region 120.

As discussed above, the input device 100 may be configured to operate in the proximity mode 620 for a pre-determined period of time. The operation of switching between input mode 610 and proximity mode 620 may be dynamically adjusted according to a variety of feedback factors, including but not limited to, object presence in either mode and/or signaling from higher level processes. In one embodiment, the input device 100 may modify the duration of time spent operating in the proximity mode 620 at step 628. In one embodiment, the duration of step 628 may be commensurate with the time in which signals received from the proximity sensor electrode 206 continue to indicate object presence in the proximity sensing region 208. In another embodiment, the input device 100 at step 628 may modify the operation of switching between input mode 610 and proximity mode 620 to operate one mode at a higher frequency or sample rate.

Figure 7:
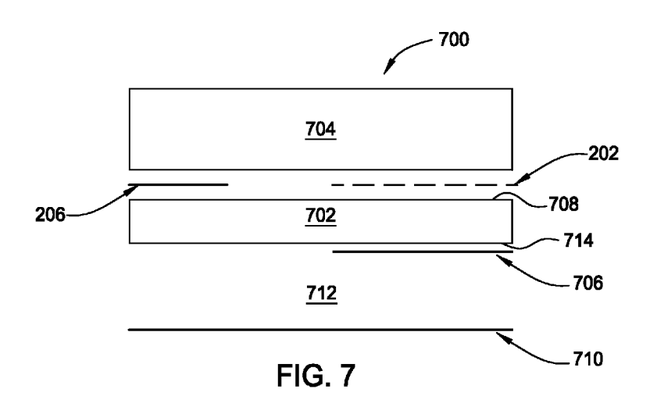
FIG. 7 depicts a schematic side view of a "one-sided" sensor configuration of an input sensor device according to one embodiment of the present invention.

FIG. 7 depicts a side view of one embodiment of the input device 100 of FIG. 2 having an exemplary stack 700 of layers for a one-sided sensor configuration. The exemplary stack 700 includes a substrate layer 702 disposed between a cover layer 704 and a shield 706. In one embodiment, transmitter sensor electrodes 202, receiver sensor electrodes 204, and the proximity sensor electrode 206 are disposed on a first side 708 of the substrate layer 702. The receiver sensor electrodes 204 are omitted from FIG. 7 for clarity of illustration.

In one embodiment, the substrate layer 702 may comprise any suitable substrate material including but not limited to glass or polyethylene terephthalate (PET). In one implementation, the substrate layer 702 may have a thickness of about 0.4 mm to about 0.5 mm.

In one embodiment, the shield 706 is disposed on a second side 714 of the substrate layer 702 and below the array of capacitive sensor electrodes 200 but is not disposed below the proximity sensor electrode 206. In one embodiment, the shield 706 disposed under the substrate layer 702 does not overlap with the proximity sensor electrode 206 or with the proximity sensing region 208 defined in the space between the proximity sensor electrode 206 and the transmitter sensor electrodes 202 and receiver sensor electrodes 204. In some embodiments, there may be a conductive layer further underneath the stack 700, for example, such as an additional ground layer 710 from a display. In the embodiment shown, an air gap 712 or nonconductive materials may provide spacing between the ground layer 710 and the proximity sensor electrode 206.

Embodiments of the invention advantageously provide a technique for performing proximity sensing in an input device that reduces the need for additional components. As described herein, the existing capacitive sensor electrodes of the input device may be "re-used" and excited to perform proximity sensing with one additional proximity sensor electrode without the need for a separate subsystem, such as an infrared detector. Additionally, the same processing system (e.g., application specific integrated circuit, or ASIC) may be utilized, needing only, in one embodiment, the reservation of an additional pin for coupling to the proximity sensor electrode 206.

Additionally, some embodiments of the invention may be operated to perform "absolute sensing" to detect an object in proximity to the touch sensor device, the techniques for transcapacitive sensing provide a number of advantages over such absolute sensing. For example, by utilizing a transcapacitive sensing proximity technique, the resulting signal range is substantially smaller than a resulting signal using absolute sensing techniques. In one embodiment, a resulting signal from a transcapacitive sensing technique is in the range of only a few hundred femto-farads while a resulting signal from an absolute capacitive proximity technique is in the range of a few pico-farads.

FIGS. 8A and 8B depict schematic side views of an alternative embodiment of the input device 100 of FIG. 5, specifically a "two-sided" sensor configuration.

FIG. 8A illustrates an exemplary stack 800A having a core layer 802, a cover layer 704, and an optional ground layer 710 separated from the core layer 802 by a nonconductive layer such as the air gap 712. The core layer 802 is a substrate layer that includes a plurality of a receiver sensor electrodes 204 disposed on a first side 804 of the core layer 802 and a plurality of transmitter sensor electrodes 202 disposed on a second side 806. The core layer 802 further includes the proximity sensor electrode 206 disposed on the first side 804 of the core layer 802. Disposing the proximity sensor electrode 206 on the same side as the receiver sensor electrodes 204 allows the proximity field lines resulting from operating in the proximity mode to be closer to any object to be detected in the proximity sensing region 208.

In one embodiment, the transmitter sensor electrodes 202 disposed on the second side 806 can be operated as a shield (e.g., shield 706 of FIG. 7). Thus, a dedicated shield may be omitted in some designs, such as those shown in FIGS. 8A and 8B.

In one embodiment, while the transmitter sensor electrodes 202 may not extend fully to the proximity sensor electrode 206, the transmitter sensor electrodes 202 may include extensions, such as the extensions 210 described above, to further facilitate a more uniform signal distribution at a corresponding border of the touch sensor device. In one embodiment, the transmitter sensor electrodes 202 may be fully extended to overlap with the proximity sensor electrode 206, as shown by stack 800B in FIG. 8B.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the foregoing is directed to embodiments of the present invention, other and further embodiments of the invention may be devised without departing from the basic scope thereof, and the scope thereof is determined by the claims that follow.

The invention claimed is:

1. An input device, comprising:
an array of capacitive sensor electrodes configured to sense objects in a first sensing region of the input device;
a proximity sensor electrode configured to sense objects in a second sensing region of the input device, the second sensing region different from the first sensing region; and
a processing system communicatively coupled to the array of capacitive sensor electrodes and the proximity sensor electrode, wherein the processing system is configured to operate in a first mode comprising:
driving a sensing signal on a transmitter sensor electrode of the array of capacitive sensor electrodes and receiving a first resulting signal from a receiver sensor electrode from only the array of capacitive sensor electrodes; and
generating an indication of an object presence in the first sensing region from the first resulting signal; and
wherein the processing system is configured to operate in a second mode comprising:
driving a sensing signal on a transmitter sensor electrode of the array of capacitive sensor electrodes and receiving a second resulting signal from only the proximity sensor electrode; and
generating an indication of an object presence in the second sensing region based on at least the second resulting signal.

2. The input device of claim 1, wherein the proximity sensor electrode extends along at least one edge of the array of capacitive sensor electrodes.

3. The input device of claim 1, wherein the processing system is further configured to, when operating in the second mode:
drive a sensing signal on a plurality of transmitter sensor electrodes of the array of capacitive sensor electrodes and receive a resulting signal from the proximity sensor electrode.

4. The input device of claim 1, wherein the processing system is further configured to, when operating in the second mode:
drive a sensing signal on at least a transmitter sensor electrode and a receiver sensor electrode of the array of capacitive sensor electrodes and receive a resulting signal from the proximity sensor electrode.

5. The input device of claim 1, wherein the proximity sensor electrode is disposed parallel to and adjacent to the transmitter sensor electrode of the array of capacitive sensor electrodes.

6. The input device of claim 1, further comprising:
a shield electrode disposed on a side of the array of capacitive sensor electrodes opposite the first sensing region, wherein the shield electrode does not overlap the proximity sensor electrode.

7. The input device of claim 1, further comprising:
a sensor substrate having a plurality of transmitter sensor electrodes disposed on a first side of the sensor substrate and a plurality of receiver sensor electrodes disposed on a second side of the sensor substrate, wherein the proximity sensor electrode is disposed on the second side of the sensor substrate.

8. The input device of claim 7, wherein at least one of the plurality of transmitter sensor electrodes overlaps with the proximity sensor electrode.

9. The input device of claim 1, comprising:
a sensor substrate having a first side, wherein the array of capacitive sensor electrodes and the proximity sensor electrode are disposed on the first side of the sensor substrate.

10. The input device of claim 1, further comprising:
a display screen, wherein the array of capacitive sensor electrodes overlay an active area of the display screen, and the proximity sensor electrode overlays a non-active area of the display screen.

11. A processing system for an input device, the processing system comprising:
sensor circuitry configured to be communicatively coupled to a proximity sensor electrode and an array of capacitive sensor electrodes having a plurality of transmitter sensor electrodes and a plurality of receiver sensor electrodes; and
control logic configured to:
operate the input device in a first mode comprising:
driving a sensing signal on at least one transmitter sensor electrode of the plurality of transmitter sensor electrodes;
receiving a first resulting signal from at least one receiver sensor electrode from only the plurality of receiver sensor electrodes; and
generating an indication of an object presence in a first sensing region from the first resulting signal; and
operate the input device in a second mode comprising:
driving a sensing signal on at least one sensor electrode of the array of capacitive sensor electrodes;
receiving a second resulting signal from only the proximity sensor electrode; and
generating an indication of an object presence in a second sensing region based on at least the second resulting signal, wherein the second sensing region is different from the first sensing region.

12. The processing system of claim 11, wherein the control logic is further configured to, when operating in the second mode:
drive a sensing signal on the plurality of transmitter sensor electrodes of the array of capacitive sensor electrodes simultaneously; and
receive a resulting signal from the proximity sensor electrode.

13. The processing system of claim 11, wherein the control logic is configured to, when operating in the second mode:
drive a sensing signal on at least one of the plurality of transmitter sensor electrodes and at least one of plurality of receiver sensor electrodes with a same electrical potential.

14. The processing system of claim 11, wherein the control logic is further configured to:
modify the indication of the object presence in the first sensing region, during operation in the first mode, in response to:
an indication of an object presence in the second sensing region when operating in the second mode.

15. The processing system of claim 11, wherein the control logic is configured to switch between operating in the first mode and operating in the second mode and wherein the control logic is further configured to:
modify a duration of time spent operating in the second mode responsive to an indication of object presence in the second sensing region.

16. A method of operating an input device having an array of capacitive sensor electrodes offset from a proximity sensor electrode, the method comprising:
operating in a first mode, the first mode comprising:
driving a sensing signal on a transmitter sensor electrode of the array of capacitive sensor electrodes;
receiving a first resulting signal from a receiver sensor electrode of the array of capacitive sensor electrodes and not from the proximity sensor electrode; and
generating an indication of an object presence in a first sensing region from the first resulting signal;
switching from the first mode to a second mode; and
operating in the second mode, the second mode comprising:
driving a sensing signal on at least one transmitter sensor electrode of the array of capacitive sensor electrodes;
receiving a second resulting signal from the proximity sensor electrode and not from a receiver sensor electrode of the array of capacitive sensor electrodes; and
generating an indication of an object presence in a second sensing region from the second resulting signal.

17. The method of claim 16, wherein the second mode further comprises:
driving a sensing signal on a plurality of transmitter sensor electrodes of the array of capacitive sensor electrodes at once; and
receiving a resulting signal from the proximity sensor electrode.

18. The method of claim 16, further comprising:
modifying the indication of object presence in the first sensing region, during operation in the first mode, in response to:
an indication of object presence in the second sensing region when operating in the second mode.

19. The method of claim 16, further comprising:
modify a time spent operating in the second mode responsive to an indication of object presence in the second sensing region.

* * * * *